Figure 1:
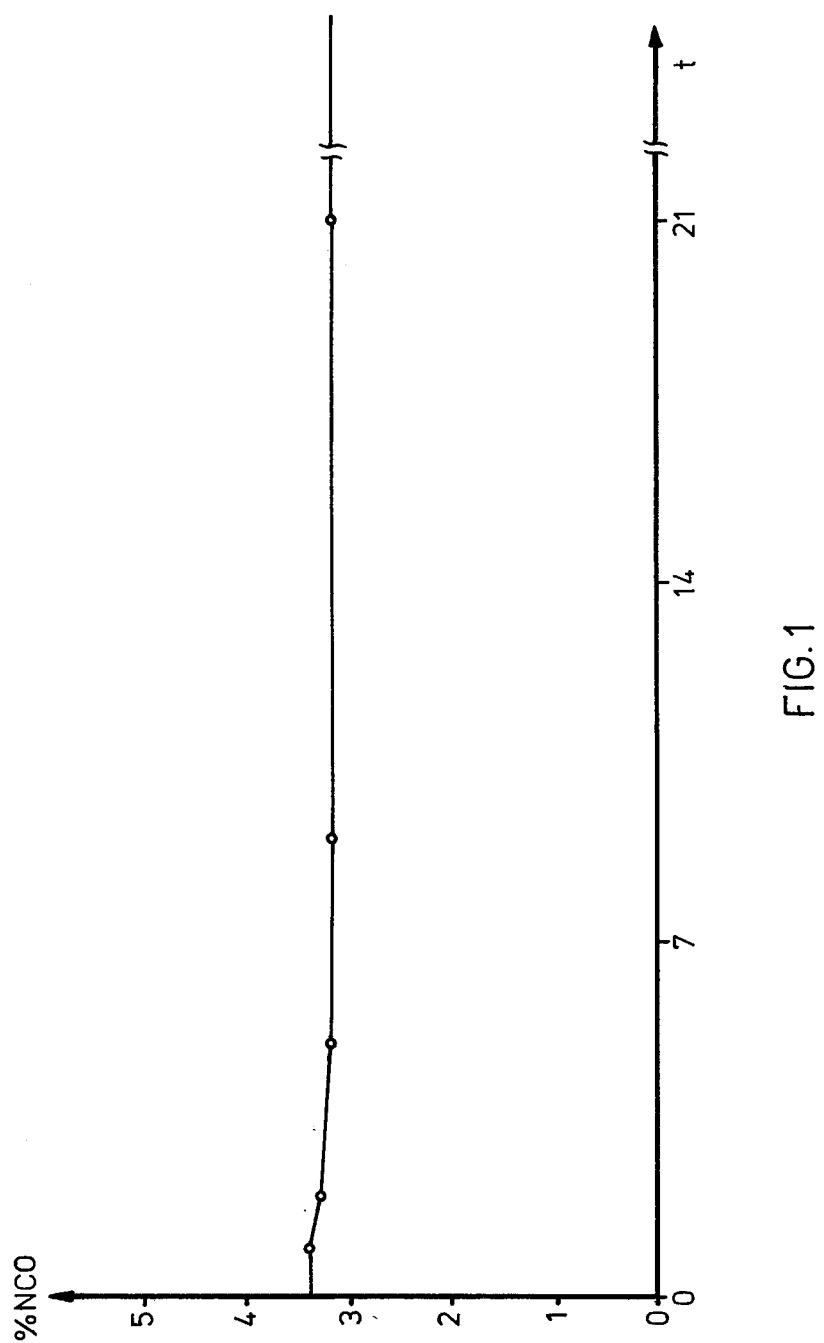

United States Patent [19]

Recker et al.

[11] 4,251,428

[45] Feb. 17, 1981

[54] THERMOSETTING MOLDING COMPOSITIONS CONTAINING POLYURETHANE AND A FIBROUS MATERIAL, AND A PROCESS FOR THE PRODUCTION OF MOLDINGS

[75] Inventors: Klaus Recker, Cologne; Gerd Reinecke, Berg.-Gladbach; Karl J. Kraft, Leverkusen, all of Fed. Rep. of Germany

[73] Assignee: Bayer Aktiengesellschaft, Leverkusen, Fed. Rep. of Germany

[21] Appl. No.: 77,979

[22] Filed: Sep. 24, 1979

[30] Foreign Application Priority Data

May 25, 1979 [DE] Fed. Rep. of Germany ....... 2921162

[51] Int. Cl.$^3$ .............................................. C08L 75/04
[52] U.S. Cl. ................................. 260/37 N; 525/424; 525/440; 528/48; 528/57; 528/67; 528/76; 528/77; 528/78; 528/85
[58] Field of Search ................. 260/37 N; 528/78, 48, 528/57, 67, 76, 77, 85; 525/424, 440

[56] References Cited

U.S. PATENT DOCUMENTS

| | | |
|---|---|---|
| 3,684,770 | 8/1972 | Meisert et al. .......................... 528/67 |
| 3,935,051 | 1/1976 | Bender et al. .......................... 528/78 |
| 4,066,397 | 1/1978 | Carroll ............................. 260/42.53 |
| 4,088,627 | 5/1978 | Gergen et al. ...................... 260/37 N |
| 3,099,642 | 7/1963 | Holtschmidt et al. ............... 260/75 |
| 3,248,370 | 4/1966 | Reischl et al. ....................... 260/75 |
| 3,326,844 | 6/1967 | Gruber ................................. 260/40 |

FOREIGN PATENT DOCUMENTS

| | | | |
|---|---|---|---|
| 1,595,604 | 8/1969 | Fed. Rep. of Germany | ...3965 22/04 |
| 2,164,381 | 6/1973 | Fed. Rep. of Germany | ..Co8g 22/04 |
| 1,133,314 | 11/1968 | United Kingdom | ............Co8g 21/02 |
| 0,009,698 | 9/1979 | European Pat. Org. | .......Co8g 18/12 |

*Primary Examiner*—Maurice J. Welsh
*Attorney, Agent, or Firm*—Gene Harsh; Joseph C. Gil; R. Brent Olson

[57] ABSTRACT

This invention relates to storable, solvent-free, thermosetting polyurethane-based molding compositions containing a fibrous reinforcing material and to the production of fiber-reinforced moldings using these molding compositions.

12 Claims, 1 Drawing Figure

THERMOSETTING MOLDING COMPOSITIONS CONTAINING POLYURETHANE AND A FIBROUS MATERIAL, AND A PROCESS FOR THE PRODUCTION OF MOLDINGS

BACKGROUND OF THE INVENTION

It is known that fiber-reinforced moldings can be produced from a number of different synthetic polymers. Glass fibers have proved to be a particularly advantageous reinforcing material. For example, it is known that resins containing unsaturated polyesters (referred to hereinafter as "UP-resins") can be processed with glass fibers to form storable semi-finished products (resin mats, prepregs; molding compositions) which can be formed by means of heated presses and hardened to form moldings combining high strength with rigidity. This process is, however, attended by several disadvantages. Thus, during the free radical initiated polymerization reaction, the monomers containing vinyl groups (for example styrene) normally used as solvents for the UP-resins lead to a very high crosslink density which in turn makes the molding extremely brittle and reduces its notched impact strength. In addition, the presence of solvents complicates processing since elaborate measures must be taken for extracting the solvent vapors and explosion-proof processing installations are generally necessary.

It is also known that polyurethane elastomers can be reinforced with fibers. Thus, glass-fiber-reinforced polyurethane moldings can be produced, for example, by the injection-molding or reaction injection-molding process. The mechanical properties of these moldings, and paricularly their stiffness in flexure, can only be improved to a limited extend because the length of the fibers used may not exceed about 1 to 6 mm for processing reasons. It is particularly disadvantageous that, due to the limited length of the fibers, the coefficient of thermal expansion of the reinforced polyurethane elastomers is still several times higher than that of steel.

German Pat. No. 968,566 describes a process for the production of high molecular weight crosslinked plastics in which an intermediate product is initially prepared from a polyester containing hydroxyl groups, a glycol and a subequivalent amount of diisocyanate. The intermediate is subsequently converted into storable semi-finished products by reaction with an excess of a diisocyanate containing uretdione groups. Finally, these semi-finished products may be subjected to plastic forming and hardened by the action of heat to form elastic moldings.

These polyurethane elastomers have a predominantly linear structure. Although they combine high elasticity with toughness, they are not hard and stiff enough for numerous applications. The use of fibrous reinforcing material is not described in the above-noted German patent. Although glass fibers having a length of greater than 6 mm, could in principle, be incorporated into the above-mentioned intermediate product, the high viscosity of the intermediate product would necessitate mixing rolls or kneaders of the type normally used in the processing of rubber for mixing in the fibers and the uretdione diisocyanate required for crosslinking. If the fibers were incorporated in this way, however, such intense shear forces would occur that the individual fibers would be reduced to fractions of their original length. It would, thus, not be possible to fully obtain the required effects of reinforcement on the one hand and reduction of the coefficient of thermal expansion on the other.

The object of the present invention is to provide new solvent-free storable molding compositions which may be hardened by molding at elevated temperature to form moldings combining extreme stiffness with high impact strength and high dimensional stability. This object is achieved by the molding compositions provided by the present invention.

DESCRIPTION OF THE INVENTION

The present invention relates to substantially solvent-free molding compositions comprising:
(A) from 25 to 91% by weight, and preferably from 40 to 78% by weight, of a polyhydroxyl prepolymer having viscosity of at least 20 Pa.s/25° C., and containing from 0.5 to 7% by weight, preferably from 1.5 to 4% by weight, based on the prepolymer, of free hydroxyl groups, from 5 to 20% by weight, preferably from 10 to 15% by weight of urethane groups (—NH—CO—O—) and from 0 to 2.5% by weight of urea groups (—NH—CO—NH—);
(B) from 4 to 15% by weight, and preferably from 7 to 10% by weight of a polyisocyanate having a melting point above 100° C., and preferably above 125° C.; and
(C) from 5 to 60% by weight, and preferably from 15 to 50% by weight of an organic or inorganic fibrous material having an average fiber length of from 10 to 100 mm, and preferably from 20 to 60 mm, the NCO-/OH-equivalent ratio (taking into account any masked NCO-groups) of components (A) and (B) being from 1:1 to 1:1.75.

The compositions of the invention may also contain from 1 to 5% by weight, based on the prepolymer, of a molecular sieve of the sodium alumosilicate type and from 0.1 to 5% by weight, based on the prepolymer, of one or more activators.

The present invention also relates to a process for the production of fiber-reinforced moldings comprising:
(A) reacting, at a temperature of from 10° to 50° C., and preferably at a temperature of from 20° to 30° C.,
 (i) a polyisocyanate liquid at the temperature selected for the reaction;
 (ii) from 80 to 97% by weight, and preferably from 85 to 91% by weight, based on the total weight of components (ii), and (iii), and (iv), of one or more compounds containing from 2 to 8 hydroxyl groups and having a molecular weight of from 300 to 10,000;
 (iii) from 3 to 15% by weight, and preferably from 6 to 12% by weight, based on the total weight of components (ii), (iii), and (iv), of a chain extender containing from 2 to 4 hydroxyl groups and having a molecular weight of from 62 to 250; and
 (iv) from 0 to 5% by weight, based on the total weight of components (ii), (iii) and (iv), of a compound containing from 2 to 4 amino groups and preferably having a molecular weight below 200, or an equivalent quantity of water;
to form a polyhydroxyl prepolymer, wherein said components (ii), (iii), and (iv) are liquid at the reaction temperature and have a mean functionally of NCO-reactive groups of from 2.0 to 2.6 and wherein the equivalent ratio between the NCO-groups of component (i) and the NCO-reactive hydrogen atoms of components (ii), (iii), and (iv) is from 0.40:1 to 0.85:1, with the proviso that if the said equivalent ratio is below 0.5:1, the said mean functionality is at least 2.1 and if the said equivalent ratio is above 0.65:1, the said mean functionality is no more than 2.4;

(B) adding to said prepolymer during and/or after step (A)

(V) a polyisocyanate having a melting point above 100° C., and preferably above 125° C.; and (vi) a fibrous material having an average fiber length of from 10 to 100 mm, and preferably from 20 to 60 mm; and (C) hardening the resultant product at a temperature above 90° C., and preferably at a temperature of from 110° to 150° C., and under a pressure of from 20 to 400 bars and preferably from 50 to 150 bars.

Component (ii) preferably contains from 2 to 4 and, most preferably 2 or 3 hydroxyl groups, and preferably has a molecular weight of from 350 to 8000. Component (ii) is preferably a mixture of (a) from 45 to 90% by weight, and preferably from 50 to 80% by weight, based on the sum of components (ii) to (iv), of a polyol having a molecular weight of from 1000 to 10,000, and preferably from 2000 to 8000; and (b) from 1 to 45% by weight, and preferably from 5 to 35% by weight, of a polyol having a molecular weight of from 300 to 950, and preferably from 350 to 800.

Component (iii) preferably contains 2 to 3 hydroxyl groups, and preferably has a molecular weight of from 76 to 150. Component (iv) preferably contains 2 amino groups.

The first step of the process may be conducted in stages. The product of step (A) generally contains from 0.5 to 7, and preferably from 1.5 to 4% by weight of hydroxyl groups, from 5 to 20%, and preferably from 10 to 15% by weight, of urethane groups and from 0 to 2.5% by weight of urea groups.

The equivalent ratio between NCO-groups of component (i) and NCO-reactive hydrogen atoms of components (ii) to (iv) is preferably from 0.45:1 to 0.80:1, and most preferably from 0.5:1 to 0.65:1.

A molecular sieve of the sodium alumosilicate type and one or more activators may be added to the polyhydroxyl prepolymer during and/or after its production.

Any polyisocyanate which is liquid at the reaction temperature, and preferably at room temperature, may be used as isocyanate component (i) in the production of the polyhydroxy prepolymer. Polyisocyanates such as these include aliphatic, cycloaliphatic, araliphatic, aromatic and heterocyclic polyisocyanates of the type generally known and described, for example, by W. Siefken in Justus Liebigs Annalen der Chemie, 562, pages 75 to 136. Examples include those corresponding to the following general formula:

wherein n=2 to 4, preferably 2, and Q represents an aliphatic hydrocarbon radical containing from 2 to 18 carbon atoms (preferably from 6 to 10 carbon atoms), a cycloaliphatic hydrocarbon radical containing from 4 to 15 (preferably from 5 to 10 carbon atoms), an aromatic hydrocarbon radical containing from 6 to 15 carbon atoms (preferably from 6 to 13 carbon atoms) or an araliphatic hydrocarbon radical containing from 8 to 15 carbon atoms (preferably from 8 to 13 carbon atoms). Specific examples include ethylene diisocyanate; 1,4-tetramethylene diisocyanate; 1,6-hexamethylene diisocyanate; 1,12-dodecane diisocyantate; cyclobutane-1,3-diisocyanate; 1-isocyanato-3,3,5-trimethyl-5-isocyanatomethyl cyclohexane (German Auslegeschrift No. 1,202,785 and U.S. Pat No. 3,401,190); 2,4- and 2,6-hexahydrotolylene diisocyanate and mixtures of such isomers; hexahydro-1,3- and/or -1,4-phenylene diisocyanate; perhydro-2,4'- and/or -4,4'-diphenyl methane diisocyanate; 2,4- and 2,6-tolylene diisocyanate and mixtures of such isomers; diphenyl methane-2,4'- and/or -4,4'-diisocyanate and liquid derivatives thereof.

According to the present invention, it is also possible to use for example polyphenyl polymethylene polyisocyanates of the type obtained by condensing aniline with formaldehyde, followed by phosgenation, and described, for example, in British Pat. Nos. 874,430 and 848,671; m- and p-isocyanatophenyl sulphonyl isocyanates as described in U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Pat. No. 1,092,007 (U.S. Pat. No. 3,152,162) and in German Offenlegungsschriften Nos. 2,504,400; 2,537,685; and 2,552,350; norbornane diisocyanates as described in U.S. Pat. No. 3,492,330; polyisocyanates containing allophanate groups of the type described, for example, in British Pat. No. 994,890, in Belgian Pat. Nos. 761,626 and in Dutch patent application No. 7,102,524; polyisocyanates containing isocyanurate groups of the type described, for example, in U.S. Pat. No. 3,001,973, in German Pat. Nos. 1,022,789; 1,222,067; and 1,027,394; and in German Offenlegungsschriften Nos. 1,929,034 and 2,004,048; polyisocyanates containing urethane groups of the type described, for example, in Belgian Pat. No. 752,261 or in U.S. Pat. Nos. 3,394,164 and 3,644,457; polyisocyanates containing acylated urea groups as described in German Pat. No. 1,230,778; polyisocyanates containing biuret groups of the type described, for example, in U.S. Pat. Nos. 3,124,605; 3,201,372; and 3,124,605 and in British Pat. No. 889,050; polyisocyanates produced by telomerization reactions of the type described, for example, in U.S. Pat. No. 3,654,106; polyisocyanates containing ester groups of the type described, for example, in British Pat. Nos. 965,474 and 1,072,956, in U.S. Pat. No. 3,567,763 and in German Pat. No. 1,231,688; reaction products of the above-mentioned isocyanates with acetals as described in German Pat. No. 1,072,385; and polyisocyanates containing polymeric fatty acid esters as described in U.S. Pat. No. 3,455,883.

It is also possible to use the isocyanate-group-containing distillation residues obtained in the commercial production of isocyanates, optionally in solution in one or more of the above-mentioned polyisocyanates. It is also, of course, possible to use mixtures of any of the above-mentioned polyisocyanates.

In general, it is particularly preferred to use the commercially readily available polyisocyanates, such as, for example, 2,4- and 2,6- tolylene diisocyanate, and mixtures of these isomers ("TDI"); polyphenyl polymethylene polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups or biuret groups ("modified polyisocyanates"), particularly modified polyisocyanates of the type derived from 2,4- and/or 2,6-tolylene diisocyanate or from 4,4'- and/or 2,4'-diphenyl methane diisocyanate.

The polyphenyl polymethylene polyisocyanates which are liquid at room temperature are particularly preferred.

Component (ii) required for the products of the polyhydroxyl prepolymer is formed by compounds containing from 2 to 8 hydroxyl groups and having a molecular weight of from 300 to 10,000 which are liquid at the reaction temperature, and preferably below 30° C. As noted earlier, component (ii) preferably comprises a mixture of polyols having a molecular weight of from 1000 to 10,000 or from 300 to 950. The higher molecular weight polyol of such a mixture preferably comprises polyols having molecular weights of from 2000 to 8000 and most particularly from 3000 to 6000, while the lower molecular weight polyol preferably comprises polyols having a molecular weight of from 350 to 800, and more particularly from 400 to 600. Regardless of whether a mixture is used, Example 9's useful polyols include polyesters, polyethers, polythioethers, polyacetals, polycarbonates and polyester amides containing from 2 to 8, and preferably from 2 to 4 hydroxyl groups, of the type generally known for the production of homogeneous and cellular polyurethanes.

The polyesters containing hydroxyl groups suitable for use in accordance with the present invention include, for example, reaction products of polyhydric (preferably dihydric) and, optionally, trihydric alcohols with polybasic (preferably dibasic) carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example, by halogen atoms, and/or unsaturated. Examples of carboxylic acids such as these and their derivatives include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimerized and trimerized unsaturated fatty acids, optionally in admixture with monomeric unsaturated fatty acids, such as oleic acid; terephthalic acid dimethyl ester and terephthalic acid-bis-glycol ester. Suitable polyhydric acid alcohols include, for example, ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, 1,2,4-butane triol, trimethylol ethane, pentaerythritol, quinitol, mannitol, sorbitol, formitol, methyl glycoside, also diethylene glycol, triethylene glycol, tetra-ethylene glycol and higher poly- ethylene glycols, dipropylene glycol and higher polypropylene glycols, dibutylene glycol and higher polybutylene glycols. The polyesters may contain terminal carboxyl groups. Polyesters of lactones such as ε-caprolactone, or of hydroxy carboxylic acids, such as ω-hydroxy caproic acid, may also be used.

The polyethers containing at least two, generally two to eight and preferably two or three hydroxyl groups suitable for use in accordance with the present invention are also generally known. They may be obtained, for example, by polymerizing epoxides, such as ethylene oxide, propylene oxide, butylene oxide, tetrahydrofuran styrene oxide or epichlorhydrin on their own, for example in the presence of Lewis catalysts, such as $BF_3$, or by the addition of these epoxides, preferably ethylene oxide and propylene oxide, optionally in admixture or successively, with starter components containing reactive hydrogen atoms. Suitable starter components include ammonia, alcohols such as ethylene glycol, 1,3-propylene glycol or 1,2-propylene glycol, trimethylol propane, glycerol, sorbitol, 4,4'-dihydroxy diphenyl propane, and amines such as aniline, ethanolamine or ethylene diamine. Sucrose polyethers of the type described, for example, in German Auslegeschriften Nos. 1,176,358 and 1,064,938 and formitol-or formose-started polyethers (German Offenlegungsschriften Nos. 2,639,083 and 2,737,951) may also be used in accordance with the present invention. In many cases, it is preferred to use polyethers which contain predominant amounts of primary OH-groups (up to 90% by weight, based on all the OH-groups present in the polyether). Polybutadienes containing OH-groups are also suitable for use in accordance with the present invention.

Among the polythioethers, reference is made in particular to the condensation products of thiodiglycol on its own and/or with other glycols, dicarboxylic acids, formaldehyde, aminocarboxylic acids or amino alcohols. Depending on the co-components, the products in question are, for example, polythio mixed ethers, polythioether esters or polythioether ester amides.

Suitable polyacetals include, for example, the compounds obtainable from glycols, such as diethylene glycol, triethylene glycol, 4,4'-dioxethoxy diphenyl dimethyl methane, hexane diol and formaldehyde. Polyacetals suitable for use in accordance with the present invention may also be obtained by polymerizing cyclic acetals such as trioxane (German Offenlegungsschrift No. 1,694,128).

Suitable polycarbonates containing hydroxyl groups are generally known and may be obtained, for example, by reacting diols, such as 1,3-propane diol, 1,4-butane diol and/or 1,6-hexane diol, diethylene glycol, triethylene glycol, tetraethylene glycol or thiodiglycol, with diaryl carbonates (for example diphenyl carbonate) or phosgene (German Auslegeschriften Nos. 1,694,080, 1,915,908 and 2,221,751; German Offenlegungsschrift No. 2,605,024).

The polyester amides and polyamides include, for example, the predominantly linear condensates obtained, for example, from polybasic saturated and unsaturated carboxylic acids or their anhydrides and polyhydric saturated on unsaturated amino alchols, diamines, polyamines and mixtures thereof.

Polyhydroxyl compounds already containing urethane or urea groups and optionally modified natural polyols, such as castor oil or carbohydrates, for example starch, may also be used (the urethane or urea groups of course have to be taken into account when calculating the amount of urethane and urea groups in the polyhydroxyl prepolymer A). Addition products of alkylene oxides with phenol formaldehyde resins or even with urea formaldehyde resins may also be used in accordance with the present invention. Before they are used in the polyisocyanate-polyaddition process, the above-mentioned polyhydroxyl compounds may be modified in various ways. Thus, according to German Offenlegungsschriften Nos. 2,210,839 (U.S. Pat. Nos.

3,849,515) and 2,544,195, a mixture of different polyhydroxyl compounds (for example a polyether polyol and a polyester polyol) may be condensed by etherification in the presence of a strong acid to form a relatively high molecular weight polyol which is made up of different segments attached through either bridges. It is also possible, for example in accordance with German Offenlegungsschrift No. 2,559,372, to introduce amide groups into the polyhydroxyl compounds, or in accordance with German Offenlegungsschrift No. 2,620,487, to introduce triazine groups by reaction with polyfunctional cyanic acid esters.

According to the present invention, it is also possible to use polyhydroxyl compounds containing high molecular weight polyadducts and polycondensates or polymers in a finely dispersed or dissolved form. Polyhydroxyl compounds such as these are obtained, for example, by carrying out polyaddition reactions (for example reactions between polyisocyanates and aminofunctional compounds) and polycondensation reactions (for example between formaldehyde and phenols and/or amines) in situ in the above-mentioned compounds containing hydroxyl groups. Processes such as these are described, for example, in German Auslegeschriften Nos. 1,168,075 and 1,260,142 and in German Offenlegungsschriften Nos. 2,234,134; 1,423,984; 2,512,285; 1,513,815; 2,550,796; 2,550,797; 2,550,833; 2,550,862; 2,633,293 and 2,639,254. It is also possible, however, in accordance with U.S. Pat. No. 3,869,413 or German Offenlegungsschrift No. 2,550,860, to mix an aqueous polymer dispersion with a polyhydroxyl compound and subsequently to remove the water from the mixture.

Polyhydroxyl compounds modified by vinyl polymers of the type obtained, for example, by polymerizing styrene and acrylonitrile in the presence of polyethers (U.S. Pat. Nos. 3,383,351; 3,304,273; 3,523,093; and 3,110,695; German Auslegeschrift No. 1,152,536) or polycarbonate polyols (German Pat. No. 1,769,795; U.S. Pat. No. 3,637,909) are also suitable for use in the process according to the present invention. Plastics having particularly good flameproof properties are obtained by using polyether polyols modified in accordance with German Offenlegungsschriften Nos. 2,442,101; 2,644,922; and 2,646,141 by graft polymerization with vinyl phosphonic acid esters and, optionally, (meth) acrylonitrile, (meth)acrylamide or OH-functional (meth)acrylic acid esters. Polyhydroxyl compounds into which carboxyl groups have been introduced by radical graft polymerization with unsaturated carboxylic acids and, optionally, other olefinically unsaturated monomers (German Offenlegungsschriften Nos. 2,714,291; 2,739,620; and 2,654,746) may be used with particular advantage in combination with mineral fillers.

Where modified polyhydroxyl compounds of the type mentioned above are used as starting component in the polyisocyanate-polyaddition process, polyurethanes having considerably improved mechanical properties are formed in many cases.

Representatives of the above-mentioned compounds used in accordance with the present invention are generally known and are described, for example, in High Polymers, Vol. XVI, "Polyurethanes, Chemistry and Technology" by Saunders-Frisch, Interscience Publishers, New York/London, Vol. I, 1962, pages 32 to 42 and pages 44 to 54 and Vol. II, 1964, pages 5 to 6 and 198 to 199, and in Kunstoff-Handbuch, Vol. VII, Vieweg-Höchtlen, Carl-Hanser-Verlag, Munich, 1966, pages 45 to 71. It is, of course, possible to use mixtures of any of the above-mentioned compounds containing at least two isocyanate-reactive hydrogen atoms and having a molecular weight of from 300 to 10,000, (for example mixtures of polyethers and polyesters).

The following are examples of suitable low molecular weight chain extenders (iii) for the production of the polyhydroxyl prepolymer: ethylene glycol; 1,2- and 1,3-propylene glycol; 1,4- and 2,3-butylene glycol; 1,5-pentane diol; 1,6-hexane diol; 1,8-octane diol; neopentyl glycol; 1,4-bis-hydroxymethyl cyclohexane; 2-methyl-1,3-propane diol; dibromobutane diol (U.S. Pat. No. 3,723,392); glycerol; trimethylol propane; 1,2,6-hexane diol; trimethylol ethane; pentaerythritol; quinitol; mannitol; sorbitol; castor oil; diethylene glycol; triethylene glycol; tetraethylene glycol; higher polyethylene glycols having a molecular weight of up to 250; dipropylene glycol; higher polypropylene glycols having a molecular weight of up to 250; dibutylene glycol; higher polybutylene glycols having a molecular weight of up to 250; 4,4'-dihydroxyl diphenyl propane; dihydroxy methyl hydroquinone; ethanolamine; diethanolamine; N-methyl diethanolamine; triethanolamine; and 3-aminopropanol.

Other low molecular weight polyols suitable for the purposes of the present invention include the mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschriften Nos. 2,639,084; 2,714,084; 2,714,104; 2,721,186; 2,738,154 and 2,738,512). In order to obtain plastics having improved fire resistance, these formoses are advantageously used in combination with aminoplast formers and/or phosphites (German Offenlegungsschriften Nos. 2,738,513 and 2,738,532).

Other low molecular weight polyols having molecular weights of up to 250 which may be used in accordance with the present invention include δ-hydroxybutyl-ε-hydroxycaproic acid ester, ω-hydroxyhexyl-γ-hydroxybutyric acid ester, adipic acid-bis-(β-hydroxyethyl)ester and terephthalic acid-bis-(β-hydroxyethyl)-ester.

For certain purposes, it is advantageous to use polyols containing sulphonate and/or phosphonate groups (German Offenlegungsschrift No. 2,719,372), preferably the adduct of bisulphite with 1,4-butene diol or its alkoxylation products.

The compounds containing at least two amino groups which may be used as component (iv) in the production of the polyhydroxyl prepolymer include, for example, aliphatic and/or aromatic diamines. Aliphatic diamines suitable for use in accordance with the present invention include, for example, ethylene diamine, 1,4-tetramethylene diamine, 1,11-undecamethylene diamine, 1,12-dodecamethylene diamine and mixtures thereof; 1-amino-3,3,5-trimethyl-5-aminomethyl cyclohexane ("isophorone diamine"); 2,4- and 2,6-hexahydrotolylene diamine and mixtures thereof; perhydro-2,4'- and -4,4'-diaminodiphenyl methane; p-xylylene diamine; bis-(3-aminopropyl)-methyl-amine; diamino-perhydro-anthracenes (German Offenlegungsschrift No. 2,638,731) and cycloaliphatic triamines as described in German Offenlegungsschrift No. 2,614,244. It is also possible in accordance with the present invention to use hydrazine and substituted hydrazines, for example methyl hydrazine, N,N'-dimethyl hydrazine and their homologs and acid dihydrazides, for example carbodihydrazide, oxalic acid dihydrazide, the dihydrazides of malonic acid, succinic acid, glutaric acid, adipic acid, β-methyl adipic acid, sebacic acid, hydracrylic acid and terephthalic acid; semicarbazido-alkylene hydrazides such as β-semicarbazidopropionic acid hydrazide (German Offenlegungsschrift No. 1,770,591), semicarbazido-alkylene carbazinic esters such as 2-semicarbazido-ethyl carbazinic ester (German Offenlegungsschrift No. 1,918,504) or even aminosemicarbazide compounds such as β-aminoethylsemicarbazido-carbonate (German Offenlegungsschrift No. 1,902,931). To control their reactivity, the amino groups may be completely or partly blocked by aldimine or ketimine groups (U.S. Pat. No. 3,734,894; German Offenlegungsschrift No. 2,637,115). Examples of aromatic diamines include bis-anthranilic acid esters as described in German Offenlegungsschrift Nos. 2,040,644 and 2,160,590; 3,5- and 2,4-diaminobenzoic acid esters as described in German Offenlegungsschrift No. 2,025,900; the diamines containing ester groups described in German Offenlegungsschriften Nos. 1,803,635 (U.S. Pat. Nos. 3,681,290 and 3,736,350) 2,040,650 and 2,160,589; the diamines containing ether groups as described in German Offenlegungsschriften Nos. 1,770,525 and 1,809,172 (U.S. Pat. Nos. 3,654,364 and 3,736,295); 2-halogen-1,3-phenylene diamines optionally substituted in the 5 position (German Offenlegungsschriften Nos. 2,001,722, 2,025,896 and 2,065,869); 3,3'-dichloro-4,4'-diaminodiphenyl methane; tolylene diamine; 4,4'-diaminodiphenyl methane; 4,4'-diaminodiphenyl disulphides (German Offenlegungsschrift No. 2,404,976); diaminodiphenyl dithioethers (German Offenlegungsschrift No. 2,509,404) aromatic diamines substituted by alkylthio groups (German Offenlegungsschrift No. 2,638,760); diaminobenzene phosphonic acid esters (German Offenlegungsschrift No. 2,459,491); aromatic diamines containing sulphonate or carboxylate groups (German Offenlegungsschrift No. 2,720,166); and the high melting diamines described in German Offenlegungsschrift No. 2,635,400. Examples of aliphatic-aromatic diamines include the aminoalkyl thioanilines described in German Offenlegungsschrift No. 2,734,574.

According to the present invention, suitable sodium alumosilicates include, for example, the zeolites commercially available as molecular sieves.

Activators suitable for use in accordance with the present invention include the polyurethane catalysts generally known in the art. Examples include tertiary amines such as triethyl amine, tributyl amine, N-methyl morpholine, N-ethyl morpholine, N,N,N',N'-tetramethyl ethylene diamine, pentamethyl diethylene triamine and higher homologs (German Offenlegungsschriften No. 2,624,527 and 2,624,528), 1,4-diazabicyclo-(2,2,2)-octane, N-methyl-N'-dimethylaminoethyl piperadine, bis-(dimethylaminoalkyl)-piperazines (German Offenlegungsschrift No. 2,636,787), N,N-dimethyl benzyl amine N,N-dimethyl cyclohexyl amine, N,N-diethyl benzyl amine, bis-(N,N-diethylaminoethyl)-adipate, N,N,N',N'-tetramethyl-1,3-butane diamine, N,N-dimethyl-β-phenyl ethyl amine, 1,2-dimethyl imidazole, 2-methyl imidazole, monocyclic and bicyclic amidines (German Offenlegungsschrift No. 1,720,633), bis-(dialkylamino)-alkyl ethers (U.S. Pat. No. 3,330,782, German Auslegeschrift No. 1,030,558 and German Offenlegungsschriften Nos. 1,804,361 and 2,618,280) and tertiary amines containing amide groups (preferably formamide groups) as described in German Offenlegungsschriften Nos. 2,523,633 and 2,732,292. Suitable catalysts also include Mannich bases of secondary amines, such as dimethyl amine, and aldehydes, preferably formaldehyde, or ketones, such as acetone, methyl ethyl ketone or cyclohexanone, and phenols such as phenol, nonyl phenol or bisphenol.

Tertiary amines containing isocyanate-reactive hydrogen atoms are also suitable for use as catalysts and include, for example, triethanolamine, triisopropanolamine, N-methyl diethanolamine, N-ethyl diethanolamine, N,N-dimethyl ethanolamine, their reaction products with alkylene oxides, such as propylene oxide and/or ethylene oxide and secondary-tertiary amines as described in German Offenlegungsschrift No. 2,732,292.

Other suitable catalysts include sila-amines containing carbon-silicon bonds, of the type described, for example, in German Pat. No. 1,229,290 (corresponding to U.S. Pat. No. 3,620,984). Specific examples are 2,2,4-trimethyl-2-silamorpholine and 1,3-diethylaminoethyl tetramethyl disiloxane.

Other suitable catalysts include nitrogen-containing bases, such as tetra-alkyl ammonium hydroxides; alkali metal hydroxides such as sodium hydroxide; alkali metal phenolates, such as sodium phenolate; or alkali metal alcoholates, such as sodium methylate. Hexahydrotriazines may also be used as catalysts (German Offenlegungsschrift No. 1,769,043).

The reaction between NCO-groups and Zerewitinoff-active hydrogen atoms is also greatly accelerated by lactams and azalactams, an associate between the lactam and the compound containing acid hydrogen initially being formed. Associates such as these and their catalytic effect are described in German Offenlegungsschriften Nos. 2,062,288, 2,062,289, 2,117,576 (U.S. Pat. Nos. 3,758,444), 2,129,198, 2,330,175, and 2,330,211.

According to the present invention, it is also possible to use organometallic compounds, particularly organotin compounds as catalysts. In addition to sulphur-containing compounds, such as di-n-octyl tin mercaptide (German Auslegeschrift No. 1,769,367; U.S. Pat. No. 3,654,927), preferred organotin compounds include tin (II) salts of carboxylic acids, such as tin (II) acetate, tin (II) octoate, tin (II) ethyl hexoate and tin (II) laurate and tin (IV) compounds, such as dibutyl tin dichloride, dibutyl tin diacetate, dibutyl tin dilaurate, dibutyl tin maleate or dioctyl tin diacetate.

All the above-mentioned catalysts may, of course, be used in the form of mixtures. In this respect, combinations or organometallic compounds and amidines, aminopyridines or hydrazino pyridines (German Offlenlegungsschriften Nos. 2,434,185 2,601,082 and 2,603,834) are of particular interest.

Further representatives of catalysts suitable for use in accordance with the present invention and information on the way in which they work are known and can be found, e.g., in Kunststoff-Handbuch by Vieweg and Höchtlen, Vol. II, Carl-Hanser-Verlag, Munich, 1966, pages 96 to 102.

It is also possible to use reaction retarders, for example acid-reacting substances such as hydrochloric acid or organic acid halides; cell regulators such as paraffins or fatty alcohols or dimethyl polysiloxanes; also pigments or dyes; flameproofing agents, for example trischloroethyl phosphate, tricresyl phosphate or ammonium phosphate and polyphosphate; stabilizers against the effects of ageing and weather; plasticizers; fungistatic and bacteriostatic substances; and fillers, such as barium sulphate, kieselguhr, carbon black or whiting.

Further examples of the various additives which may optionally be used in accordance with the present invention and information on the way in which these additives are used and on their respective modes of action may be found, e.g., in Kunststoff-Handbuch, Vol. VII, by Vieweg and Höchtlen, Carl-Hanser-Verlag, Munich, 1966, 103 to 113.

Component (B) of the molding compositions (corresponding to component (v) in the process) according to the invention may be any polyisocyanates (preferably diisocyanates) having a melting point above 100° C., and preferably between 125 and 200° C. Examples of suitable polyisocyanates include 1,4-dichloro-2,5-diisocyanatobenzene, 1-chloro-4-methoxy-2,5-diisocyanatobenzene, 1,3-dimethoxy-4,6-diisocyanatobenzene, 3,3'-dimethoxy-4,4'-diisocyanatobiphenyl, 2,5,2',5'-tetramethyl-4,4'diisocyanatodiphenyl methane, diphenyl sulphone-4,4'-diisocyanate, naphthylene-1,5-diisocyanate and the urea diisocyanate of 1 mol of water and 2 mols of 2,4-tolylene diisocyanate (cf. German Offenlegungschrift No. 2,902,469). The last three diisocyanates are preferred. According to the present invention, preferred solid high-melting polyisocyanates also include diisocyanates containing a uretdione group of the type obtained by the known dimerization of the polyisocyanates commonly encountered in polyurethane chemistry. Dimeric 2,4-tolylene diisocyanate is particularly preferred.

Before it is used, the high-melting polyisocyanate is preferably size-reduced to a particle size of less than 40 μ.

The fibrous component of the invention may be any inorganinc and/or organic fibrous reinforcing materials such as glass (preferably in lengths of form 20 to 60 mm), graphite fibers and asbestos fibers or fibrous materials emanating from an organic polymer, for example from a polyester, polyethylene terephthalate or a polyamide, such as polyhexamethylene adipamide or polycaprolactam. These fibrous materials may be in the form of, for example, cloth, mats, tows, cables, continuous fibers or chopped staple fibers. According to the present invention, it is preferred to use glass fibers finished by a known method with sizes which give the fibers an affinity for polyurethanes (cf. for example German Auslegeschriften Nos. 2,426,657 and 2,426,654).

The quantity of fibrous material to be incorportated depends on the required improvement in the mechanical properties of the molding. In general, the fibrous material is used in a quantity of from 5 to 60% by weight, based on the total weight of the fiber-reinforced molding composition.

In addition to the fibrous materials, it is possible, as already mentioned, to use other additives, for example fillers such as chalk, carbon black, clay, iron oxide, mica, silica-containing materials, titanium dioxide and colored pigments, lubricants and release agents, such as Zn-sterate, UV-absorbers, and the like.

The preferred method for producing the composites of the instant invention follows: Component (v) is preferably suspended in component (i) although it may also be made into a paste in the mixture of components (ii) to (iv) before component (i) is added. The activator and molecular sieve may also be added at this time although the activator is preferably added as late as possible so that the reaction does not take place too quickly.

The equivalent ratio of component (i) to the sum of components (ii) to (iv) and the mean functionality of components (ii) to (iv) of isocyanate-reactive groups are interdependent. A relatively high degree of branching requires less pre-extension of the polyol mixture with isocyanate (which is the same as a low equivalent ratio) to provide the prepolymer A) (and hence the molding composition) with a viscosity value which is favorable for further processing. Conversely, a low degree of branching must be compensated by a higher equivalent ratio. In general, for an equivalent ratio of $\leq 0.5:1$, the mean functionality must be $\geq 2.1$; for an equivalent ratio of $\geq 0.65:1$, the mean functionality amounts to $\leq 2.4$. By mixing the suspension of the component (v) in component (i) with the mixture of the other components or by mixing the suspension of component (v) in the mixture of components (ii) to (iv) (and, optionally, molecular sieve and activator) with component (i), the poly-addition reaction between the active hydrogen containing compounds and the liquid polyisocyanate (i) is started.

By virtue of the relatively low viscosity of the reaction mixture, the fiber materials may then be incorporated by the methods normally used for UP-resins. The ripening time required to obtain the storable, heat-formable intermediate product amounts to between a few hours and eight days, depending on the temperature, the amount of activator used and the choice of the starting materials. The formation of the polyhydroxyl prepolymer A is completed over this period, apparently without significant participation of the high-melting polyisocyanate (v), as can be shown by titrating the total NCO-content with n-dibutyl amine.

After the ripening time, the molding compositions according to the present invention remain stable in storage for at least 10 days (depending on the temperature) which is sufficient for practical purposes. Within this period, the molding compositions may be formed by the action of temperatures above 90° C., preferably between 110° and 150° C., and pressures between about 20 and 400 bars and hardened in about 1 to 10 minutes to form moldings which combine comparatively high stiffness in flexure with high impact strength and tear propagation resistance.

The present invention is illustrated by the following Examples in which the quantities quoted represent parts by weight or percentages by weight unless otherwise indicated.

EXAMPLE 1

| | Component I |
|---|---|
| 84 | parts of a linear polypropylene glycol containing primary terminal OH-groups (molecular weight: 4000) |
| 13 | parts of 1,2-propylene glycol |
| 3 | parts of a branched polypropylene glycol (functionality = 3, molecular weight: 450) |
| 2 | parts of polypropylene glycol adipate (molecular weight: 820) |
| 5 | parts of ®Zeolith A of Bayer AG, Germany, i.e. Na-Al-silicate in the form of a 50% paste in a partially branched polypropylene glycol (molecular weight: 3700, functionality = 2.75) |
| 0.5 | part of N,N-dimethyl benzyl amine |
| 100 | parts of calcium carbonate (chalk) |
| 1 | part of the lead salt of phenyl ethyl dithiocarbamic acid. |

The mean functionality of the compounds containing isocyanate-reactive groups in component I amounts to 2.04.

| | Component II |
|---|---|
| 38 | parts of a commercial diphenyl methane diisocyanate mixture (NCO-content: 31%) consisting of 70% of 4,4'-diphenyl methane diisocyanate, 5% of 2,4'-diphenyl methane diisocyanate and 25% of polynuclear polyphenyl polymethylene polyisocyanates |
| 19 | parts of dimeric 2,4-tolylene diisocyanate |

| | Component III |
|---|---|
| 67 | parts of glass rovings of a commercial fiber having a diameter of from 11 to 14μ coated in accordance with Example 1 of German Auslegeschrift 2,426,657, cut to a length of 52 mm. |

(a) Production of the molding composition according to the present invention:

First of all, components I and II are homogeneously mixed in the ratio indicated using suitable metering and mixing units. The reactive mass is spread over a polyethylene film in a thickness of from 1 to 2 mm using a coating knife. The pot life or knife-coating time amounts to about 20 minutes.

Glass rovings cut to a length of 52 mm are then scattered over the spread layer and covered with a second PU-layer also spread over polyethylene film. Satisfactory impregnation of glass fibers is then obtained by means of ribbed pressure rollers. On completion of the prepolymer reaction, which takes place at room temperature, the polyethylene film can be peeled off the resin mat.

(b) Production of a molding:

To produce moldings, portions corresponding to the particular mold are cut out of the mat and molded at 120° C./75 bars. Hardening takes from 3 to 10 minutes, depending on the layer thickness. The ffinished molding may then be removed from the mold while still hot. It is also possible to introduce several layers one on top of the other into the mold because the material coalesces homogeneously during molding. Even with fairly long flows, satisfactory transport of the glass fibers into the innermost corners of the molding is guaranteed. The molding composition produced in accordance with a) remains stable in storage at room temperature for at least 14 days. The processing life may be further increased by storage at lower temperatures.

the following properties were measured on the hardened test plates produced as described in (b):

| Test values without glass fibers (comparison): | |
|---|---|
| Density according to DIN 53 479 | 1.470 Mg/m$^3$ |
| Hardness Shore A/D according to DIN 53 505 | 95/98 |
| Tensile strength according to DIN 53 504 | 11 MPa |
| Elongation at break according to DIN 53 504 | 144% |
| Tear propagation resistance according to DIN 53 515 | 44 KN/m |
| Bending modulus according to ASTM D 790-71 | 196 MPa |
| Coefficient of linear expansion according to VDE 0304/Part 1 | 230 × 10$^{-6}$ grd$^{-1}$ |
| Test values with glass fibers | |
| Density (DIN 53 479) | 1.550 Mg/m$^3$ |
| Tensile strength (DIN 53 504) | 47 MPa |
| Elongation at break (DIN 53 504) | 5% |
| Tear propagation resistance (DIN 53 515) | 260 KN/m |
| Bending modulus (ASTM D 790-71) | 1840 MPa |
| Coefficient of linear expansion (VDE 0304/Part 1) | 8 × 10$^{-6}$ grd$^{-1}$ |
| Cold notched impact strength at −30° C. (DIN 53 453) | 71 KJ/m$^2$ |

EXAMPLE 2

| | Component I |
|---|---|
| 70 | parts of a branched polypropylene glycol containing terminal primary OH-groups (molecular weight: 6000; functionality = 3) |
| 30 | parts of a branched polypropylene glycol (molecular weight: 450; functionality = 3) |
| 10 | parts of 1,4-butane diol |
| 5 | parts of Na-Al-silicate in the form of a 50% paste in a partially branched polypropylene glycol (molecular weight: 3700; functionality = 2.75) |
| 2 | parts of polypropylene glycol adipate (molecular weight: 820) |
| 100 | parts of calcium carbonate (chalk) |
| 1 | part of diethyl tolylene diamine |
| 1 | part of the lead salt of phenyl ethyl dithiocarbamic acid. |

Mean functionality of the compounds containing isocyanate - reactive groups in component (I): 2.32.

| | Component II |
|---|---|
| 35 | parts of the commercial diphenylmethane diisocyanate mixture of Example 1 |
| 30 | parts of dimeric 2,4-tolylene diisocyanate |

| | Component III |
|---|---|
| 68 | parts of the glass rovings of Example 1. |

This formulation is processed in the same way as described in Example 1. Molding gives products which are harder and hence also stiffer in flexure, as can be seen from the test values:

| Test values without glass fibers: | |
|---|---|
| Density (DIN 53 479) | 1.440 Mg/m$^3$ |
| Hardness Shore A/D (DIN 53 505) | 97/63 |
| Tensile Strength (DIN 53 504) | 12.6 MPa |
| Elongation at break (DIN 53 504) | 90% |
| Tear Propagation resistance (DIN 53 515) | 67 KN/m |
| Bending modulus (ASTM D 790-71) | 314 MPa |
| Coefficient of linear expansion (VDE 0304/Part 1) | 210 × 10$^{-6}$ grd$^{-1}$ |
| Test value with glass fibers: | |
| Density (DIN 53 479) | 1.575 Mg/m$^3$ |
| Tensile strength (DIN 53 504) | 52 MPa |
| Elongation at break (DIN 53 504) | 5% |
| Tear propagation resistance (DIN 53 515) | 280 KN/m |
| Bending modulus (ASTM D 790-71) | 1950 MPa |
| Coefficient of linear expansion (VDE 0304/Part 1) | 8 × 10$^{-6}$ grd$^{-1}$ |
| Cold notched impact strength at −30° C. (DIN 53 453) | 84 KJ/m$^2$ |

EXAMPLE 3

In order to demonstrate stability in storage, a molding composition is produced from the formulation of Example 2, but without the glass fibers, using the procedure of Example (1a). Measuring the NCO-content of the molding composition by titration with 0.1 N dibutyl amine in dimethyl formamide shows that, after about 5 days, a value of 3.2% is reached and does not change over the seven-week test period. A theoretical NCO-group content of the high-melting polyisocyanate of 3.4% is calculated from the quantity of dimeric tolylene diisocyanate present in the formulation. From this, it may be concluded that the solid polyisocyanate does not react with the OH-prepolymer to any significant extent.

FIG. 1 shows the content of titratable NCO-groups in the molding composition as a function of the storage time in days at 20° C.

EXAMPLE 4 (comparison)

| 22 | parts of the commercial diphenyl methane diisocyanate mixture and |
|---|---|
| 33 | parts of dimeric 2,4-tolylene diisocyanate | are added as isocyanate component (II) to the polyol mixture (I) of Example 1, followed by processing with 67 parts of glass rovings in the manner described.

In this formulation, the NCO/OH equivalent ratio is 0.4 as opposed to the value of 0.7 in Example 1. On completion of the prepolymer reaction, the product was extremely soft and could not be separated from the polyethylene film.

Transport of the glass fibers during molding was unsatisfactory. Due to the low back pressure, inclusions of air and bubbles occur.

EXAMPLE 5 (comparison)

| 44.6 | parts of the commercial diphenyl methane diisocyanate mixture and |
|---|---|
| 22 | parts of dimeric 2,4-tolylene diisocyanate | are mixed as isocyanate component (II) with the polyol mixture (I) of Example 2 followed by the incorporation of 68 parts of glass rovings. In this case, the NCO/OH equivalent ratio of components (I) and (II) is 0.7 as opposed to the value of 0.55 in Example 2. After the preliminary reaction, the material has solidified to such an extent that no flow takes place in the mold under the molting conditions specified above.

What is claimed is:

1. Substantially solvent-free molding compositions comprising:
   (A) from 25 to 91% by weight, based on the weight of the molding composition, of a polyhydroxyl prepolymer having a viscosity of at least 20 Pa.s/25° C. andcontaining from 0.5 to 7% by weight, based on the prepolymer, of free hydroxyl groups, from 5 to 20% by weight, based on the prepolymer, of urethane groups, and from 0 to 2.5% by weight, based on the prepolymer, of urea groups,
   (B) from 4 to 15% by weight, based on the weight of the molding composition, of a polyisocyanate having a melting point above 100° C. and
   (C) from 5 to 60% by weight of an organic or inorganic fibrous material having an average fiber length of from 10 to 100 mm, the NCO/OH equivalent ratio (taking into account any masked NC0-groups) of components A and B amounting to between 1:1 and 1:1.75.

2. The composition of claim 1 further containing from 1 to 5% by weight, based on the prepolymer, of a molecular sieve of the sodium aluminum silicate type and from 0.1 to 5% by weight, based on the prepolymer, of one or more activators.

3. The composition of claim 1, characterized in that component (A) contains from 1.5 to 4% by weight of hydroxyl groups and from 10 to 15% by weight of urethane groups.

4. The composition of claim 1, characterized in that component (B) is a diisocyanate containing uretdione groups.

5. The composition of claim 4, characterized in that component (B) is dimeric tolylene diisocyanate.

6. The composition of claim 1, characterized in that component (C) is a glass fiber material having an average length of from 20 to 60 mm.

7. A process for the production of fiber-reinforced polyurethane-based moldings comprising:
   (A) reacting at a temperature of from 10° to 50° C.,
      (i) a polyisocyanate liquid at the reaction temperature,
      (ii) from 80 to 97% by weight, based on the sum of components (ii) to (iv), of one or more compounds containing from 2 to 8 hydroxyl groups and having a molecular weight of from 300 to 10,000,
      (iii) from 3 to 15% by weight, based on the sum of components (ii) to (iv) of a chain-extending agent containing from 2 to 4 hydroxyl groups and having a molecular weight of from 62 to 250 and, optionally,
      (iv) from 0 to 5% by weight, based on the sum of components (ii) to (iv) of a compound containing from 2 to 4 amino groups having isocyanate-reactive hydrogen atoms or an equivalent quantity of water, to form a polyhydroxyl prepolymer, wherein said components (ii) to (iv) are liquid at the reaction temperature selected and have a mean functionality of isocyanate-reactive groups of from 2.0 to 2.6, and
      wherein
      the equivalent ratio between NCO-groups of component (i) and NCO-reactive hydrogen atoms of components (ii) to (iv) is from 0.4:1 to 0.85:1, with the proviso that if the said equivalent ratio is below 0.5:1 the said mean functionality of components (ii) to (iv) is at least 2.1 and if the said equivalent ratio is above 0.65:1, the said mean functionality is no more than 2.4;
   (B) adding to said prepolymer during and/or after step (A),
      (v) a polyisocyanate having a melting point above 100° C. and
      (vi) a fibrous material having an average length of from 10 to 100 mm; and
   (c) hardening the product thus obtained at a temperature above 90° C. and under a pressure of from 20 to 400 bars.

8. The process of claim 7 wherein from 1 to 5% by weight, based on the prepolymer, of a molecular sieve of the sodium aluminum silicate type and or from 0.1 to 5% by weight, based on the prepolymer, of one or more activators are added at step (B).

9. The process of claim 7, characterized in component (II) comprises a mixture of
   (a) from 45 to 90% by weight, based on the sum of components (ii) to (iv), of one or more polyols having a molecular weight of from 1000 to 10,000 and (b) from 1 to 45% by weight, based on the sum of components (ii) to (iv), of one or more polyols having a molecular weight of from 300 to 950.

10. The process of claim 9, characterized in said mixture comprises
   (a) from 50 to 80% by weight, based on the sum of components (ii) to (iv), of one or more polyols having a molecular weight of from 2000 to 8000 and
   (b) from 5 to 35% by weight of one or more polyols having a molecular weight of from 350 to 800.

11. The process of claim 7, characterized in that a diamine having a molecular weight below 200 is used as component (iv).

12. The process of claim 7, characterized in that a powder-form diisocyanate containing uretdione groups and having a particle size of less than 40μ is used as component (v).

* * * * *